(12) United States Patent
Horwood

(10) Patent No.: US 10,701,160 B2
(45) Date of Patent: Jun. 30, 2020

(54) SYSTEM AND METHOD FOR A UNIFIED INTERFACE TO NETWORKED WEBSERVICES

(71) Applicant: Polybit Inc., San Francisco, CA (US)

(72) Inventor: Keith Horwood, San Francisco, CA (US)

(73) Assignee: Polybit Inc., San Francisco, CA (US)

( * ) Notice: Subject to any disclaimer, the term of this patent is extended or adjusted under 35 U.S.C. 154(b) by 133 days.

(21) Appl. No.: 15/663,401

(22) Filed: Jul. 28, 2017

(65) Prior Publication Data

US 2018/0034924 A1  Feb. 1, 2018

Related U.S. Application Data

(60) Provisional application No. 62/367,718, filed on Jul. 28, 2016.

(51) Int. Cl.
 *H04L 29/08* (2006.01)
 *H04L 29/06* (2006.01)
(52) U.S. Cl.
 CPC .............. *H04L 67/16* (2013.01); *H04L 67/10* (2013.01); *H04L 67/34* (2013.01); *H04L 67/40* (2013.01); *H04L 29/06* (2013.01); *H04L 67/02* (2013.01); *H04L 67/28* (2013.01)
(58) Field of Classification Search
 USPC ....................................................... 709/226
 See application file for complete search history.

(56) References Cited

U.S. PATENT DOCUMENTS

| | | | | |
|---|---|---|---|---|
| 7,076,633 | B2* | 7/2006 | Tormasov | G06F 16/10 711/203 |
| 9,288,608 | B2* | 3/2016 | Richardson | H04W 12/12 |
| 2003/0144894 | A1* | 7/2003 | Robertson | G06Q 10/06 709/226 |
| 2006/0111880 | A1* | 5/2006 | Brown | G06F 8/20 703/1 |
| 2014/0136936 | A1* | 5/2014 | Patel | G06F 17/2247 715/212 |

OTHER PUBLICATIONS

G. Lawton, "Developing Software Online With Platform-as-a-Service Technology," in Computer, vol. 41, No. 6, pp. 13-15, Jun. 2008. doi: 10.1109/MC.2008.185.*

* cited by examiner

*Primary Examiner* — Brian Whipple
*Assistant Examiner* — John Fan
(74) *Attorney, Agent, or Firm* — Brian Van Osdol; Alpine Patents LLC

(57) ABSTRACT

A system and method for a function-as-a-service platform that includes creating a set of distinct webservices within a webservice hosting platform, which involves receiving a webservice resource definition, processing the webservice resource definition, and instantiating a webservice of the webservice resource definition within the webservice hosting platform; and invoking a webservice instantiated in the webservice hosting platform for a client device, which involves: receiving a webservice function call request, executing the webservice function call request on a webservice instance, and responding to the webservice function call request with a result of the webservice.

20 Claims, 6 Drawing Sheets

Webservice submitted to acme namespace

```
function.js
/**
 * A function that prints name and adds numbers
 * @param {string} name Your name
 * @param {number} a A number
 * @param {number} b A number
 * @returns {string}
 */
module.exports = (name, a = 0, b = 0, callback) => {
  if (a < 0 || b < 0) {
    return callback(new Error('a and b must be greater than or equal to 0'));
  }
  return callback(null, `Hello ${name}, ${a} + ${b} = ${a + b}`);
};
```

```
definition.json
{  "function": {
     "description": "A function that prints name and adds numbers",
     "params": [
       { "name": "name",
         "type": "string",
         "description": "Your name"},
       { "name": "a",
         "type": "number",
         "description": "A number"},
       { "name": "b",
         "type": "number",
         "description": "A number"}
     ],
     "returns": {
       "type": "string"
     }
  }
}
```

FIGURE 3

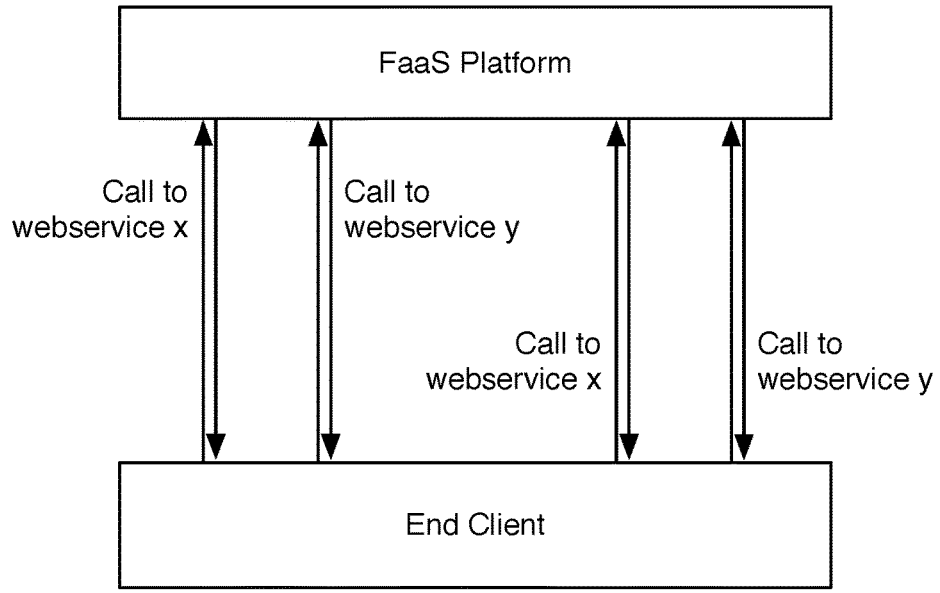
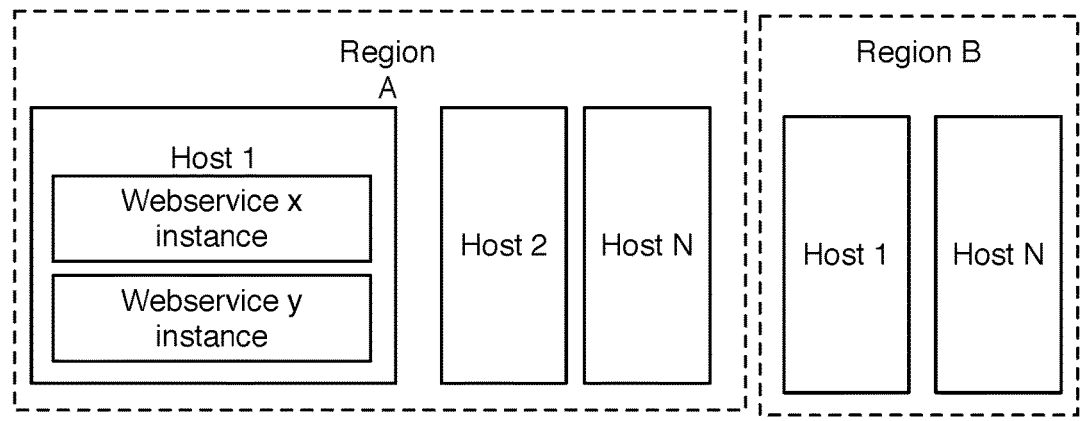
FIGURE 6

1. Analyzing combined usage
Webservice X
```
function.js
const lib = require('lib');
module.exports = (location = 'San Francisco', name = 'Jane', callback) => {
  lib.namespace.weather(location, (err, result) => {
    if (err) {
      return callback(err);
    }
    return callback(null, `Hello ${name}, the weather in ${location} is ${result}`);
  });
};
```
Weather Webservice
2. Colocating webservices
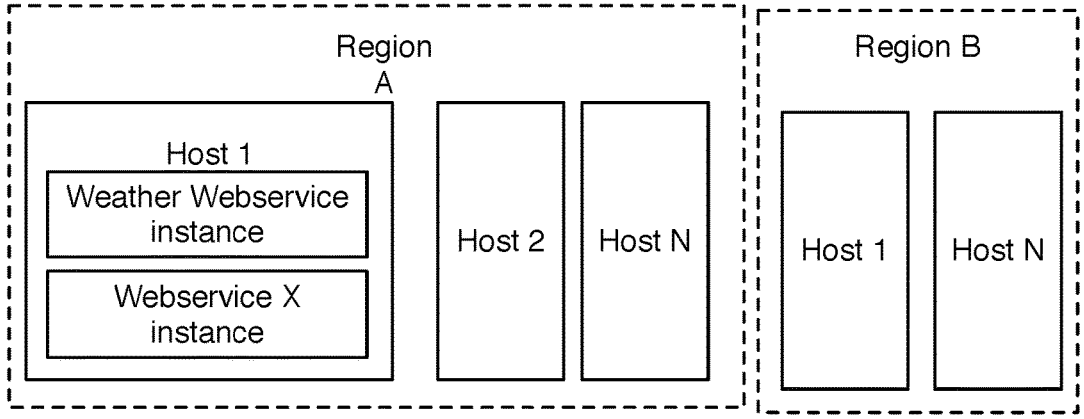
FIGURE 7

SYSTEM AND METHOD FOR A UNIFIED INTERFACE TO NETWORKED WEBSERVICES

CROSS-REFERENCE TO RELATED APPLICATIONS

This Application claims the benefit of U.S. Provisional Application No. 62/367,718, filed on 28 Jul. 2016, which is incorporated in its entirety by this reference.

TECHNICAL FIELD

This invention relates generally to the field of developer tools, and more specifically to a new and useful system and method for a unified interface to networked webservices.

BACKGROUND

There are a wide variety of tools and resources available to developers. In recent years, application programming interfaces (APIs) have grown in popularity not just as a way of accessing functionality but as a "product" offered by businesses and services. Consumers of outside APIs can benefit by leveraging functionality built and managed by others within their own applications and services. However, the approach to providing an API or any programmatic interface is highly fractured with numerous API standards in use. This can be burdensome to API consumers in that they must customize how each API is integrated into their product or service. At the same time, it can be time consuming and resource intensive for an entity to provide an API. In particular, the complexity of standing up infrastructure to support an API can deter smaller developers and/or open source developers from offering an API. Thus, there is a need in the developer tool field to create a new and useful system and method for a unified interface to networked webservices. This invention provides such a new and useful system and method.

BRIEF DESCRIPTION OF THE FIGURES

FIG. 3 is a representation of an exemplary webservice definition;

FIGS. 6 and 7 are schematic representations of variations for managing webservice instance scaling according to combined usage.

DESCRIPTION OF THE EMBODIMENTS

Figure 1:
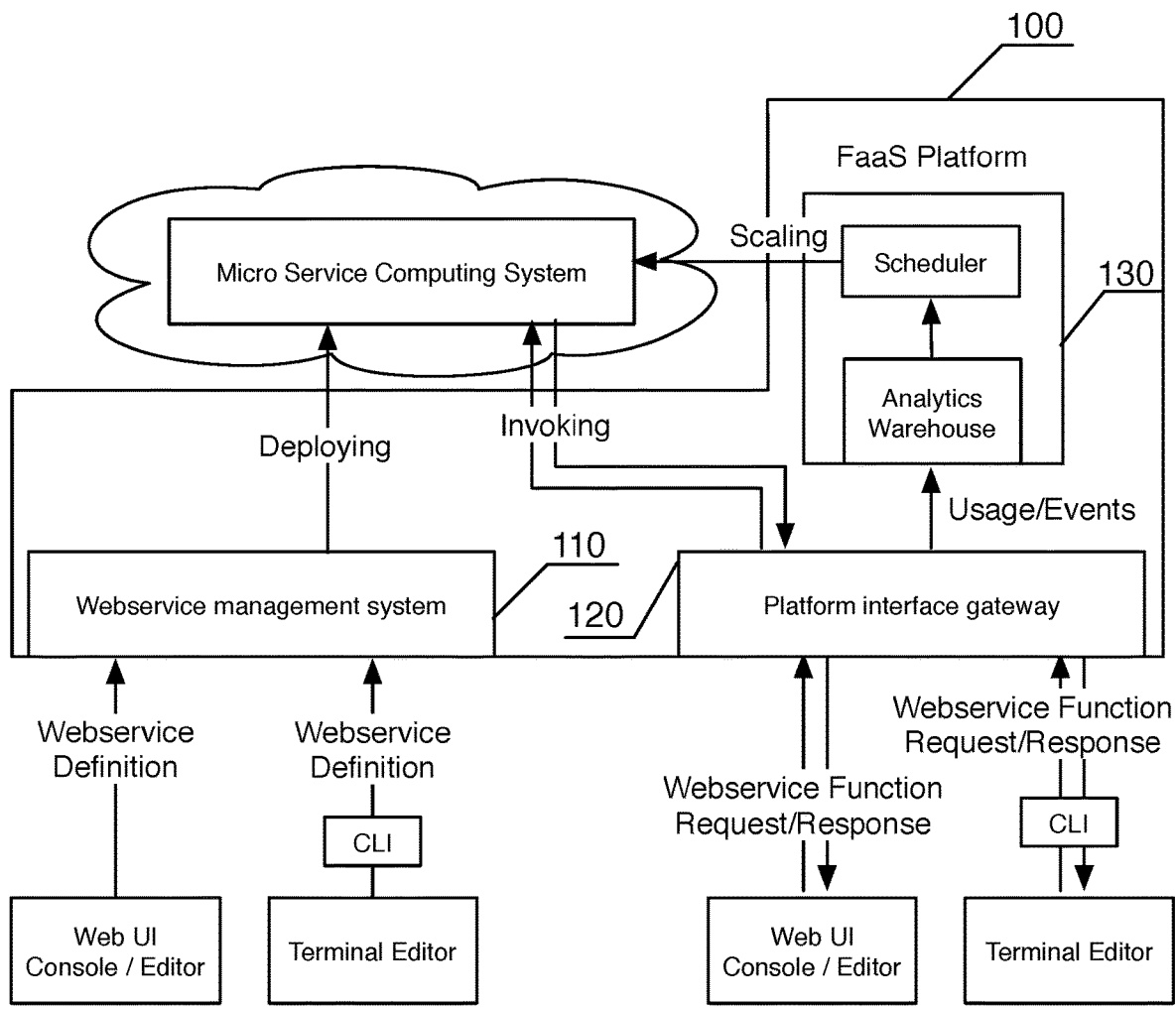
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for a unified interface to networked webservices of a preferred embodiment functions to provide a streamlined approach that enables access to a wide variety of programmatic and/or computational services. The system and method can be used to provide a function-as-a-service (FaaS) offering, wherein functionality across a wide variety of services can be made easily accessible and scalably offered to those wishing to consume that webservice. The system and method enable sets of functionality to be developed and deployed as a webservice to a FaaS platform.

The system and method can preferably address creation of services, adapting existing services for a unified interface, discovery of services, the usage of services by other entities, monetization and management of service usage, and/or management of hosting services.

The system and method provides an alternative approach to how programmers traditionally offer developer tools. The webservice functionality of a first variety can be routines and services that may otherwise be offered through traditional APIs. For example, a third party may utilize the FaaS platform as an abstraction layer on top of a traditional API (e.g., a REST API). A developer can then easily utilize the webservice functionality within the FaaS platform through a unified interface and the developer can be alleviated of the complexity of learning the details of how to interface with the traditional API of the third party. The webservice functionality of a second variety may provide static or dynamic processing routines. This functionality may have traditionally been distributed through various packages and libraries that a developer would have to install and/or import. These would have to be updated and individually managed on each device. Through the system and method, programmers can more easily utilize these processing routines by using the unified interface approach and without having to manage various libraries and/or packages. Simplification of an application's library and package dependencies, which may be enabled through the system and method, may make that application more portable to other computing environments.

A webservice as used here can characterize any collection of computational functionality. A webservice will generally provide a focused and fine-grained set of functionality as a form of microservice. A webservice is also generally coupled, integrated, or used by other webservices or systems. Other services, applications, or systems can be described as consuming a webservice to perform some task. A webservice may alternatively provide any suitable scope of functionality and may, for example, offer numerous distinct sets of functionality. A webservice is preferably responsive to a set of input parameters. Some instances of a webservice may generate output parameters. Additionally or alternatively, triggering of a webservice may result in some action taken by the webservice. A webservice of a preferred implementation is a single function with a clear interface protocol that can be executed within an event-driven computing service. In one example, a webservice is a node.js function with a number of required and/or optional input parameters and a set of output parameters. However, a webservice can be defined using any suitable language, framework or form of run-time environment. That computing service may use a computing execution model where the provider dynamically manages resource allocation as a way of providing "serverless computing". Alternatively, persistent computing resources may be allocated for different webservices for multiple events and/or for a sustained window of time.

As a first potential benefit, the system and method can abstract the development of an API service away from infrastructure challenges, developer tool development, and/ or other challenges that must be addressed beyond the core functionality of a service. Thus, developers wishing to provide an API or distribute their code can simply deploy their code to the FaaS as a network accessible webservice. Infrastructure management can be automatically handled by the FaaS. For example, a webservice deployed to the FaaS system can automatically be accessible through a command line interface (CLI), a software development kit (SDK), various device libraries, an application layer based application programming interface (API) (e.g., a REST API), a graphical web-interface, and/or any other forms of interfaces offered by the FaaS.

As a second potential benefit, the system and method enable a streamlined approach to leveraging functionality offered through the FaaS platform. Consumers of APIs can easily begin using a wide variety of services by using the programmatic interface of the FaaS. Preferably, a developer can leverage functionality by first establishing use of the FaaS (e.g., by including a standard library of the FaaS, installing a command line tool, and/or by specifying the domain of the FaaS) and then using a namespacing syntax to call selected webservices through the FaaS platform. In some ways, the FaaS platform can act as the standardized library or tool for programmatically interfacing with network enabled-webservices. This may increase speed of development and may enable easier experimentation with new webservices.

As another potential benefit, the system and method may provide help and documentation support, webservice search and discovery, auto-correction or automatic suggestions for a webservice function call, and/or other developer support tools. In a documentation support variation, automatically generating documentation that can be conveniently invoked during development. For example, supported input parameters of a webservice function call could be enumerated using a documentation command of a CLI to the FaaS. In a search and discovery variation, functionality queries can be used in browsing and identifying an appropriate webservice to meet some functionality goal. In some variations, a generic interface may be used in invoking a webservice and the FaaS facilitates selection of the underlying webservice from a set of possible webservices.

As another potential benefit, webservices deployed to the FaaS platform can have automatically enabled analytics, scaling, and support for various developer tools and client interfaces (e.g., command line, web, SDK, etc.). As a system and method designed to host multiple webservices, the scaling of computing infrastructure and instantiation of webservices can dynamically adapt based on predicted usage.

As another potential benefit, the system and method can provide a unified platform for webservice discovery. Discovery of webservices and usage instructions/documentation may even be integrated into the various interfaces used in accessing the webservices, which can function to make use of new webservices more accessible. In some instances, generic interfaces may be used to selectively invoke one of a set of possible webservices. This may promote standardization of interfaces.

As an exemplary use case, a company may develop a set of functionality following guidelines of the FaaS platform. The functionality may interface with an outside computing platform of the company. For example, the functionality may enable access to information about a user on a social network, or submit a media file for some action on a third party platform, and/or any suitable action. The functionality may alternatively be a processing routine that acts on input data without depending on outside network-accessible resources. The functionality is deployed to the FaaS platform as a webservice. Developers wishing to use this webservice can then call the webservice through the unified interface of the FaaS platform. Furthermore, any other webservice deployed on the FaaS platform can also be called through the unified interface. Access to the set of webservices on the FaaS platform can further be achieved using a single dependency to the FaaS platform. A rich set of functionality is then opened up to any network-connected device.

2. System

A shown in FIG. 1, a system for a unified interface to networked webservices of a preferred embodiment is preferably implemented as a FaaS platform 100 that includes a webservice management system 110, a platform interface gateway 120, and an infrastructure management system 130. The system is preferably deployed as a multitenant computing platform. As a multitenant computing platform, multiple distinct entities can independently create, deploy, or consume webservices offered through the FaaS platform 100. Herein, the system is generally referred to as a FaaS platform 100, but the system may alternatively be implemented as a single tenant computing architecture or alternative architecture and not offered "as a service". Through the FaaS platform 100, the system functions to enable a first entity to create and make available the use of a webservice, and to enable a service, application, or other system to invoke the use of that webservice.

An account system can enable entities to create and manage webservices deployed to the platform and/or optionally use webservice offered by the FaaS platform 100. Various third party services, developers, and other entities use the system to offer programmatic interfaces to their customized webservice. Similarly, consumers of the system can leverage the provided functionality seamlessly in their services, devices, or applications.

The FaaS platform Dm preferably supports a number of interfaces. A unifying syntax can be used by each interface in using the webservices. The unifying syntax can offer uniformity and consistency to interactions with the webservices. Interfaces to the FaaS platform 100 can include a command line interface, a web interface, an HTTP API interface, various SDK interfaces, and/or other suitable interfaces. The web interface can preferably work on a desktop computer, a mobile computer, or any suitable browser.

The Webservice management system 110 of a preferred embodiment functions as system that manages creating, editing, updating, or otherwise setting up the offering of a webservice. A developer will preferably provide some definition of a webservice to the Webservice management system no. When a webservice is ready, the developer or managing account can push a version of the webservice for deployment. The Webservice management system 110 will process that deployment request and deploy the webservice through the infrastructure management system 130 if successful. A webservice definition is preferably a function definition and a configuration definition. A function definition is preferably code that specifies how one or more functions are executed when called. The configuration definition can provide information about the webservice such as its name, permissions, policies, customized settings, documentation, and/or other properties.

In one example, initializing a new webservice will create a webservice project that includes a functions directory, a package configuration file, an environment configuration file, and a documentation document. The functions directory can include one or more function files that can contain application logic or scripts used to define functions and other functionality. The package configuration file can be used to specify the name of the service, the version number, a description, author, specify the main entry point of the service, specify any dependencies, set deployment options, and set other configuration properties. The environment configuration file can be used to define various execution environment variables. The documentation document can be used in specifying documentation and information about the webservice. The webservice definition may additionally adhere to one of a set of webservice semantics. The webservice semantics could follow various patterns and protocols so that aspects of the webservice can be interpreted through the semantics used in defining the webservice. For example, comments may be used in specifying input parameters and their expected type. This may be used in generating documentation and type checking during use of the webservice. Comments, variable or function naming conventions, and/or other semantics used in the logic for defining a webservice may be analyzed for particular patterns that denote some meaning that can then be automatically applied at the interface gateway to such a webservice by a compatible computing platform. Such webservice semantics may be targeted for serverless computing environments, where webservice semantics can be applied towards promoting standard calling conventions (e.g., HTTP), type safety, enforced documentation, background execution, rate limiting, authentication, and/or other features. This could additionally be used in other suitable computing environments such as the ones discussed herein.

The system may additionally include a webservice development environment, which may be web console, an application, an IDE plugin or any suitable application. The function development environment preferably facilitates creation and deployment of a webservice. The webservice management system 110 preferably interfaces with the webservice development environment in receiving or updating webservice definitions. A developer may alternatively use his or her own tools in developing a webservice definition. In one example, a webservice may be synchronized with a version-controlled repository, which may be hosted as a remote repository on a hosting platform or a locally managed repository.

The webservice management system 110 can additionally handle compilation and transformation of the webservice definition, installation of required packages, internal registration of the webservice (e.g., setting webservice name and id), and/or other tasks used in preparing the webservice for use. In particular, the Webservice management system 110 prepares for deploying a webservice to a webservice computing infrastructure.

The platform interface gateway 120 of a preferred embodiment handles function call requests made to a webservice. Function calls made through an interface are directed to the gateway 120 where the gateway 120 processes the requests. The platform interface gateway 120 is configured to determine webservice routing, to transform the function call to a suitable format for a webservice instance of the webservice, and to track usage. The FaaS platform 100 preferably supports at least one programmatic interface used in accessing a webservice. Supported interfaces can include a command line interface, an SDK, a library interface, an API (e.g., REST API), a web interface, and/or any suitable type of interface. Supported interfaces may additionally include function packaging for third party platforms such as messaging application integrations or digital assistant integrations. In some variations, the platform interface gateway 120 can be compatible to one or more sets of defined webservice semantics. Type checking and inferencing, rate limiting, authentication, and/or other aspects specified through the webservice semantics can be inforced through the platform interface gateway 120.

The platform interface gateway 120 can additionally support providing documentation through one of the interfaces. For example, function call syntax and input parameter options can be provided by requesting webservice usage instructions. Similarly, the platform interface gateway 120 may provide webservice discovery and/or automatic selection. In a discovery variation, an interface or other suitable browsing interface can be used in querying for a particular type of webservice. Automatic selection may be used in interpreting intent of a function call, selecting an appropriate webservice, and translating the intent to an invocation of the selected webservice.

The platform interface gateway 120 may additionally include a caching system that can dynamically cache webservice responses. In one variation, the caching system analyzes the webservice definition and/or usage to determine if and when caching should be used.

The platform interface gateway 120 can additionally include a metering system that tracks usage of a webservice. Collected usage data may be used in generating billing, limiting or otherwise restricting usage, dynamically adjusting infrastructure management, reporting on usage, and/or performing any suitable action. In one variation, a developer of a webservice can setup paid usage of the webservice. Usage of that webservice can be tracked by authenticated users making the request. Various usage metrics and billing practices could be applied in generating a bill for the users of the webservice.

The infrastructure management system 130 of a preferred embodiment manages a deployed webservice. In one variation, a webservice cloud is hosted on an outside third party distributed computing infrastructure. The infrastructure management system 130 in that variation coordinates and manages the outside cloud. In one implementation, a serverless computing platform may be used to execute an instance of a webservice on-demand in response to a webservice request. In another variation, at least a portion of the webservice cloud is internally managed in the FaaS platform 100. The infrastructure management system 130 in that variation can directly manage the webservice computing resources used in executing instances of the webservice to service some request to the webservice. Self-managed computing resources may enable enhanced control over dynamic allocation of webservice instances. In another variation, the FaaS platform 100 may use a hybrid approach where internal/managed computing resources can be used for a subset of webservices and third party computing resources for serverless execution used for another subset of webservices or requests.

The infrastructure management system 130 preferably manages current demand for webservices, which can involve instantiating a webservice instance to handle current requests. The infrastructure management system 130 can additionally manage proactive, predictive computing allocation for webservices. Preferred forms of predictive allocation can include predicting based on temporal usage, regional usage, and/or combined webservice usage. In some scenarios, different webservices are frequently used in combination. This combined usage of webservices may be addressed in the management of computing resources. In one variation, a first webservice will internally call a second webservice—accordingly, usage of the first webservice could result in usage of the second webservice. In another variation, an outside system may commonly use two or more webservices—accordingly, use of one webservice by the outside system could be an indicator for use of another webservice. Management of the webservices can involve proactively allocating a webservice instances (or deallocating), regionally distributing webservices (e.g., to minimize network latency), setting up shared computing resources, and/or taking any suitable action for combined usage of webservices. In the case where the first webservice sometimes depends on a second webservice, the infrastructure management system 130 could instantiate both webservices in the same computing resource and reroute calls to the second webservice directly to the computing resource. This can avoid unnecessary network traversal. The infrastructure management system 130 may additionally support other execution related tasks of the system.

3. Method

Figure 2:
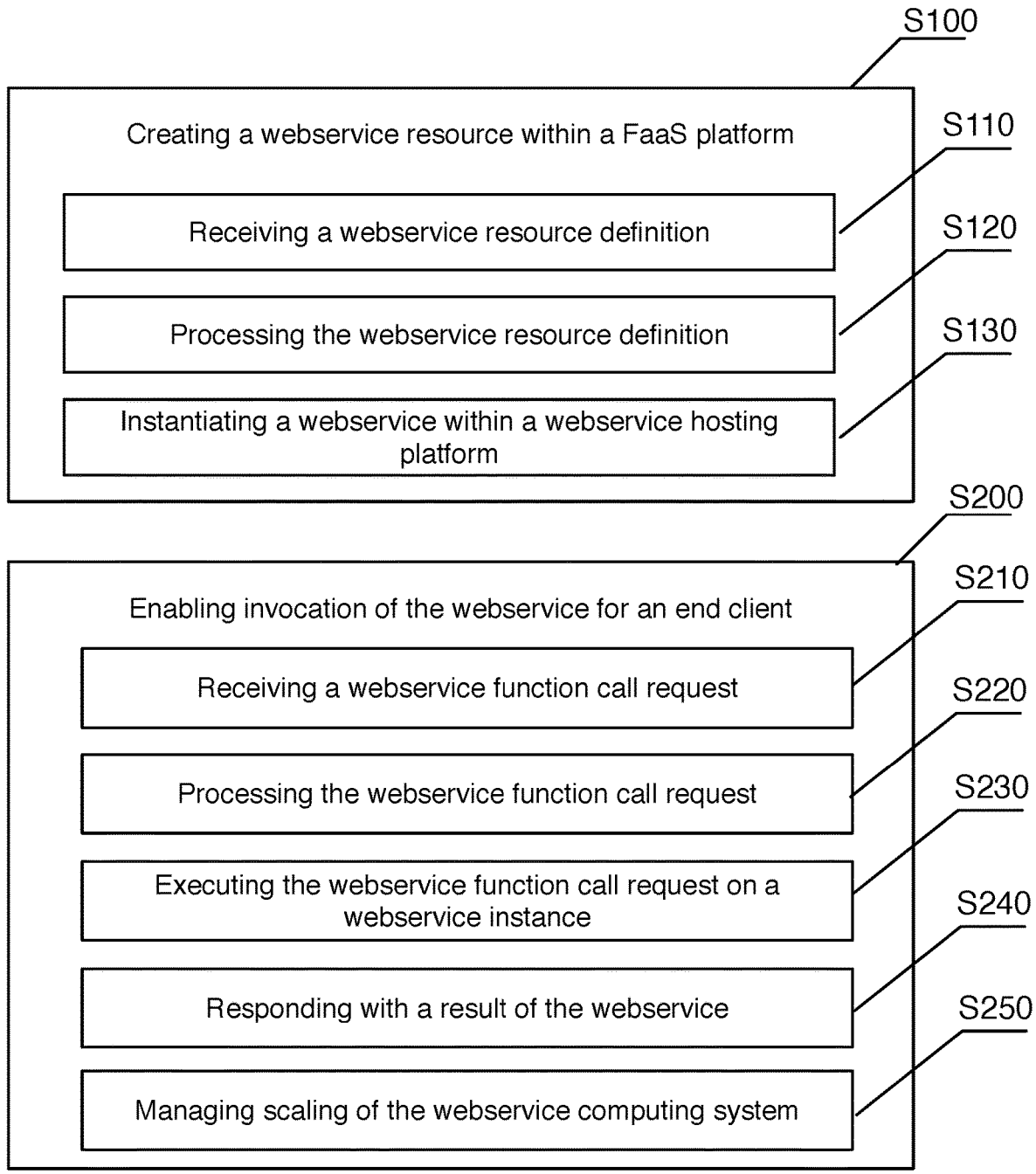
FIG. 2 is a flowchart representation of a preferred embodiment method.

As shown in FIG. 2, a method for a unified interface to networked webservices of a preferred embodiment can include creating a webservice within a FaaS platform S100 and enabling invocation of the webservice resource for an end client S200. Creating a webservice resource within a FaaS platform S100 preferably includes receiving a webservice resource definition S110, processing the webservice resource definition S120, and instantiating a webservice within a webservice hosting platform S130. Enabling invocation of the webservice for an end client preferably includes receiving a webservice function call request S210, processing the webservice function call request S220, executing the webservice function call request on a webservice instance S230, and responding with a result of the webservice S240.

The method is preferably implemented by a FaaS platform as described above, but any suitable system may alternatively be used. As a FaaS platform, the method is preferably implemented as a multitenant platform where different accounts can individually create one or more webservices that may be used, invoked, and consumed by other entities. In one preferred implementation, a multitenant specific implementation of creating a webservice can include creating a set of webservices within a webservice hosting platform that comprises for each webservice: receiving a webservice resource definition from an account entity of the webservice hosting platform, processing the webservice resource definition, and instantiating a corresponding webservice. As a result, multiple webservices can be established on the FaaS platform, which promotes an ecosystem of webservices accessible through the FaaS platform. An account entity may manage one or more webservices. The invoking a webservice will involve the receiving of a specified webservice function call request, processing the webservice function call request, executing the webservice function call request on a webservice instance, and responding with a result of the webservice. This invocation of the webservice may be performed by a variety of entities depending on the permissions and settings of the webservice. Anonymous entities and services may call the webservice. Alternatively, usage may be restricted or limited to authenticated entities. While the webservice may be used by the same entity as the creator, in many scenarios, the webservice will be used by other entities.

Block S100, which includes creating a webservice within a FaaS platform, functions to enable third party platforms and/or outside developers to offer a set of functionality through the FaaS platform. The webservice can perform any suitable task. In some instances, the webservice is an abstraction to third party platform interactions that are also offered over a traditional API. For example, a third party platform (e.g., social network, SaaS platform, etc.) may build a webservice as a proxy interface into their external platform. This can make the third party platform accessible through a webservice of the FaaS platform. In one variation, the webservice may be used to offer the only externally exposed interface into a third party platform. For example, a developer wanting to quickly enable an API to their system can build a webservice to facilitate this, and then documentation, CLI support, SDK support, various libraries could automatically be made available by being a webservice on the FaaS platform. In other instances, a webservice may perform some processing routine such as transforming data, analyzing data, recording data, and/or any suitable routine. For example, the webservice may take some input data and calculate a transformation of that data and return the result as the response. In one variation, the processing routine can use one or more outside services, which could include accessing external services (e.g., a social network platform) and/or calling another webservice. In another variation, the processing routine can be fully defined through the logic of the webservice (e.g., no outside service is used). A webservice preferably includes at least one function but may include a set of functions and/or resource definitions.

A developer will preferably register an account with the FaaS platform. A developer account may set various options for how a webservice is managed by the FaaS platform. One option could include privacy settings. A webservice may be offered as a public function wherein anyone can use the function. Alternatively, a webservice could be private or set with limited access permissions. A webservice could additionally include account collaboration options wherein other developer accounts could be granted different permissions for the webservice resource. Various features and options of a webservice may be enabled based on the type of account (e.g., a free account or a paid account). As another aspect, a developer could configure billing options for the webservice. The billing options may enable a developer to easily enable monetization of a webservice by setting billing rate and billing events. In one implementation, a developer could set highly customized billing options. For example, one developer may bill per request and another developer may bill based on usage rate. Alternatively, a limited set of billing options may be enforced by the FaaS platform.

Block S110, which includes receiving a webservice definition, functions to retrieve instructions on how a webservice should operate. A webservice definition is preferably one or more data objects. Preferably the webservice definition includes one or more function definitions and a configuration definition. The function definition preferably provides usage instructions for an associated script or routine written in a programming language: for example (but not limited to), required parameters, expected return values, cost to execute the function. One or more programming languages may be supported. The configuration definition may set various properties of the webservice such as its namespace, permissions, documentation, and/or other aspects of the webservice. These definitions can exist separately or as part of a single data structure.

Namespace configuration preferably specifies, at least in part, how the webservice is identified when making a request to the webservice. As the webservices of the FaaS platform may be globally accessible to users of the FaaS platform, the namespace is preferably globally unique within the platform.

Permission configuration can set access limits, specify usage limits, and/or set other forms of policy of the webservice. Access limits may include settings such as private access, public access, authenticated accounts only, allowing a permitted listed of accounts, prohibiting list of blocked accounts, and/or other suitable forms of access limits. Access limits could additionally be specified for particular actions of the webservice. For example, use of a particular function or input parameter may only be permitted for a subset of entities.

Usage limit configurations can be used to rate limit usage, place caps for different entities, or set any other form of restriction.

Documentation is preferably specified through one or more documents. This documentation can then be made available through the various interfaces used in accessing the webservice. In addition to manually set documentation, analysis of the function definition may be used to derive documentation support. For example, the input parameters and the output parameters may be characterized through analysis of the function definition. In one variation, pre-defined semantics can be followed in the function definition to facilitate automatically generating documentation. Natural language processing or other analysis of the function definition may additionally or alternatively be used.

Webservice semantics may be applied in any suitable part of a webservice definition and can be used in setting instantiation and execution of the webservice in block S200.

As shown in FIG. 3, a webservice definition could include a JavaScript function definition file and a JSON configuration definition file. In this example, the JavaScript function is written in ES6 JavaScript and is used to generate some text result, and the JSON configuration definition file is used to set the namespace property of the webservice. The configuration definition file may be manually created or edited by a developer of the webservice. Alternatively, the configuration definition file may be programmatically generated or inferred by the function, function comments, or other sources. As shown in the example of FIG. 3, parameter type can be inferred through webservice semantics in the comments of the function definition. For example, webservice semantics of the comments in function.js may direct typechecking of the variables 'a' and 'b' so that a TypeError is returned if a non-numeric value is submitted.

The webservice definition is preferably developed and submitted by an outside entity, preferably an account entity. Some set of webservices may be created as first party functions of the FaaS platform. These webservices may be those managed, maintained, and/or otherwise provided by the FaaS platform operator. These could be accessible in a particular namespace for easy access. In some cases, a generic webservice may be used as a proxy interface to dynamically selected webservices. These generic webservices may be offered through the FaaS platform. For example, a mapping webservice may have a generic mapping interface protocol, but the FaaS platform dynamically translates requests to the generic mapping webservice into one of a set of mapping specific webservices. Other webservices may use other namespaces. In one implementation, the account name may be used in scoping namespace of different webservices. For example, webservice-A and webservice-B of account X may be accessed by specifying X/webservice-A.

In one variation, the webservice definition is created and submitted through a function development environment offered by the FaaS platform. For example, a web IDE on a website of the FaaS platform could enable easy creation, testing, and configuration of a webservice. In another variation, the webservice definition can be submitted through a command line interface tool offered by the FaaS. A developer may develop the webservice definition and then easily deploy the function by executing a deploy command on the command line.

Block S120, which includes processing the webservice definition, functions to transform the webservice definition for hosting within the platform. Processing the webservice definition can include a variety of sub-processes such as a compilation and transformation sub-process, a package installation sub-process, and/or a webservice registration sub-process. A compilation and transformation sub-process preferably prepares a corresponding webservice for deployment within a webservice infrastructure (e.g., a serverless computing environment for microservices). A package installation sub-process preferably installs packages required by the webservice and required to support the programming language of the webservice definition. Webservice registration can include assigning id and namespace of the webservice and any function calls. The various functions preferably operated in one namespace such that functions can be globally referenced by using a unique name.

Block S130, which includes instantiating a webservice within a webservice hosting platform, functions to setup the webservice for execution through the FaaS platform. Instantiating preferably includes publishing or making accessible the webservice through the FaaS platform. The webservice can be made discoverable through search queries and browsing and the namespace for the webservice can become active for receiving usage requests. In the case where an at least partially persistent instance of a webservice is used for execution, instantiating a webservice may include deploying the webservice within some computing system. This preferably prepares at least one programmatic resource in a scalable computing infrastructure to handle inbound requests or events for the webservice. The FaaS platform preferably uses a microservice architecture. Additionally, the computing resources can be replaceable and/or scaled. A webservice instance can preferably process some volume of requests. Multiple webservice instances can be deployed to scale the number of requests supported by the platform. The webservice is preferably deployed as at least one webservice instance, but a set of webservice instances will typically make up the webservice. The webservice computing system can utilize computing resources directly managed by the operators of the FaaS platform but may alternatively or additionally be computing resources offered by a third party distributed computing service. In a serverless variation, webservice instances are dynamically deployed on-demand to a serverless computing environment where the webservice instance is instantiated, executed to handle a request, and then possibly deallocated from that computing resource. In this case, webservice instances may not be proactively instantiated. In a hybrid variation, a subset webservice instances can be deployed to platform managed computing resources and a second subset of webservice instances may be dynamically allocated through a serverless execution environment. Any suitable computing architecture may alternatively be used.

Block S200, which includes enabling invocation of the webservice for an end client, functions to enable users to consume or use the webservice within their own product or service. As mentioned, one potential benefit of the system and method is that a developer can easily gain access to a wide variety of tools through a unified interface of the FaaS platform. A library of the FaaS platform may be all that a developer needs to install or include in their script, application, or product to gain access to a wide variety of APIs and function routines offered as webservices.

Block S210, which includes receiving a webservice function call request, functions to be prompted by a consumer of a webservice to perform some action. Requests will generally be generated by a script, an application, or a service. Requests can alternatively be directly initiated by a user using one of the interfaces of the FaaS platform. The consumer of the webservice may additionally be anonymous in that it may not be associated with an account. Alternatively, the consumer of the webservice may authenticate with the FaaS platform so that usage is associated with a particular account.

Figure 4:
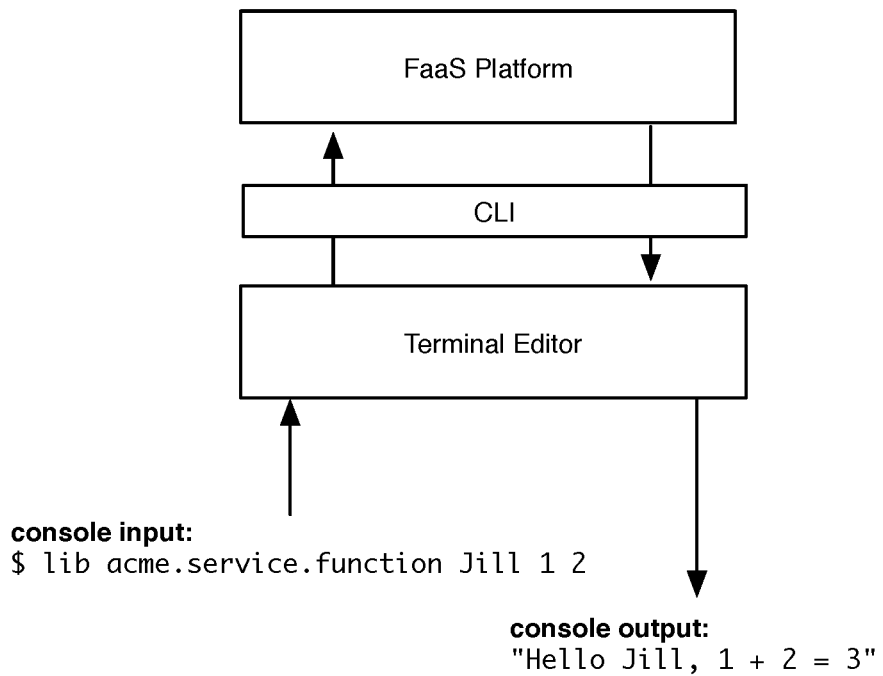
FIG. 4 is a schematic representation of exemplary usage of a command line interface.
Figure 5:
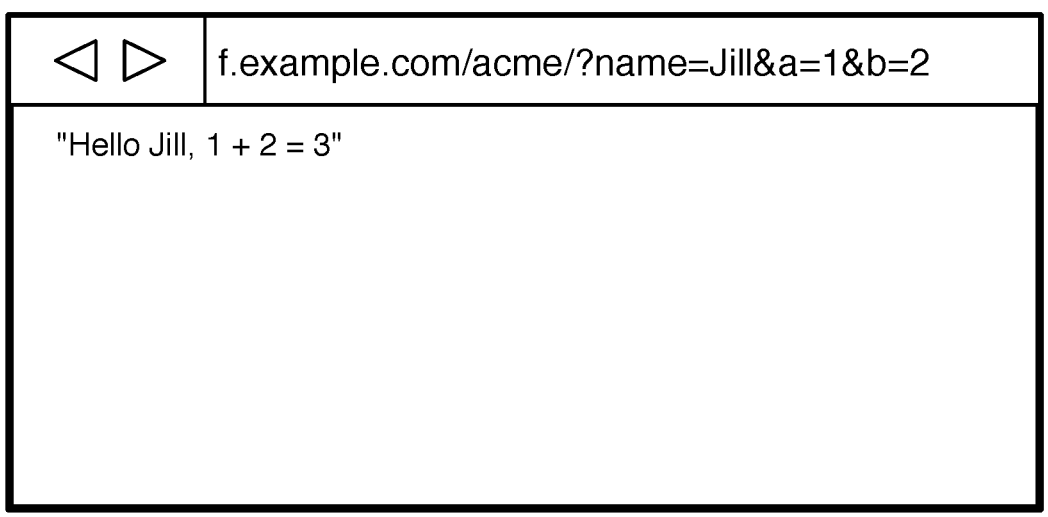
FIG. 5 is a schematic representation of exemplary usage of a browser interface.

The webservice function call request is preferably received over an application layer protocol and more specifically an HTTP-based protocol such as HTTP or HTTPS. The webservice function call may alternatively be received over any suitable communication protocol, or a novel communication protocol optimized for FaaS execution that minimizes data transfer overhead. The webservice function call request can be made through one of a set of interface options such as a command-line interface, a browser interface, a SDK interface, and/or a user application interface. In one implementation, a command-line interface can be used to call the webservice function of the FaaS platform where the webservice function is referenced through a namespace syntax and then various arguments, flags, verbose flags, values, and/or files can be specified. As shown in FIG. 4, the exemplary webservice can be called with various inputs over the command line. The webservice may alternatively be called using an alternative unified interface such as a browser as shown in FIG. 5.

Accordingly, the method may include providing a set of standard interfaces capable of receiving request. More specifically, the method can include providing a set of function call interfaces that comprise at least a command line interface, a library interface, a web browser interface, an SDK interface, a graphical user interface, and/or an API. Different webservice function call requests can be received through different interfaces. In one variation, the method can include providing a web browser interface. The web browser interface may be used by any browser-enabled device. The browser interface can include graphical user interface exposed through a web application. The browser interface could additionally or alternatively include a URL formatting syntax for specifying a webservice request. The result of the webservice request can be returned in the webpage rendered for that URL. In another variation, the method can include providing a command line interface. A user may install a FaaS command line package to gain a simplified way of invoking various webservice functions of the FaaS platform. In another variation, an SDK interface could be provided for a variety of programming environments. The SDK interface may be used when developing native applications. An application that uses the SDK will then make network requests to the FaaS platform in response to the webservice usage in the application. Similarly, library interfaces may be provided. In yet another variation, an application may offer an interface through a graphical user interface. This may enable non-developers to easily perform actions through various services without needing to have knowledge of programming. In another variation, an API such as a REST API may be provided for making programmatic webservice requests directly. Any suitable interface may be provided via the FaaS platform, and preferably each of these interfaces could be automatically enabled for any webservice.

In connection with providing an interface for making a function call, the method may include providing manual documentation through at least one of the interfaces. For example, manual documentation for a specified webservice can be accessed through the command line interface.

Similarly, the method may include providing a query interface to the set of webservices. Search queries can be executed in identifying a webservice matching some query parameters. In response to a webservice query, the method preferably generates a set of webservice query results. In one variation, a webservice function call can be made in the form of a webservice query, which can then trigger automatic selection of one of a set of webservice query results to be used as the invoked webservice. For example, a webservice call may be made querying for a weather reporting webservice to return the weather for a specified address. Suitable webservices that matching the query properties (e.g., the webservice should report weather, and accept an address as an input). The selection of the webservice may be based on closest match to the query, the webservice popularity ranking, and/or other factors. In one variation, webservices may be able to be selectively promoted. For example, sponsored webservices may be prioritized for selection due to their status over one or more popular webservices.

In a variation related to webservice queries, the method can include providing a generic webservice interface, and, when a function call is made to the generic webservice interface dynamically selecting one of a set of compatible webservices for processing of a function call to the generic webservice. The generic webservice interface preferably defines a standard format for a class of webservices. For example, the FaaS platform may make a generic weather webservice interface. To be a compatible webservice, developers can adapt their webservice interface to conform at least in part to the generic weather webservice interface to become an eligible option.

Block S220, which includes processing the webservice function call request, functions to determine how to handle an inbound request. Processing the request preferably includes determining routing to a function of a webservice. The namespace syntax of the webservice function call request is analyzed to identify a corresponding webservice. Processing the request can include transforming the function call request for the function service. This may include translating the provided arguments for the webservice. Type checking or inferencing, error reporting, rate limiting, authentication, and/or other aspects may be enforced at the gateway layer during the processing of the webservice function call. As mentioned above, defined webservice semantics may be used in the webservice definition, which could translate into various forms of processing of the webservice function call. Processing the request can additionally include logging analytics. Events and metadata related to usage of a function service is preferably tracked and stored in a data analytics warehousing solution.

In some instances, processing the request may invoke function help and/or search results. Usage help and documentation can be integrated so that a user can easily access documentation on how to call a particular webservice. Additionally, a webservice function call request may similarly request information about the webservice such as a description, documentation, the name of the developer, and/or other information. In yet another variation, a webservice function call request may be invalid, and processing the request can include generating automatic help and suggestions to assist the developer. As yet another variation, a webservice function call request may invoke a search wherein search results of appropriate webservices may be returned. Similarly, automatic selection of a webservice may be performed in response to a function call that queries for a suitable webservice and/or a function call to a generic webservice interface.

Block S230, which includes executing the webservice function call request on a webservice instance, functions to execute the function within the webservice computing system. Invoking the function preferably includes delivering a command to a webservice instance of the function service. The webservice will generate some result value, which is then returned to the requesting entity via block S240. In one variation, an instance of the webservice may be previously allocated, and the function call request can be loadbalanced to an appropriate webservice instance. In a serverless variation, a webservice instance may be instantiated in a dynamic computing environment and the function call request processed by that dynamically allocated webservice.

In one variation, the method may additionally include managing scaling of the webservice computing system S250, which functions to orchestrate the plurality of webservices in an intelligent manner. As discussed, analytics can be collected on webservice usage by tracking invocation (or usage) of a webservice. The analytics is preferably collected across all users and client devices. Historical models can be used to automatically manage the scaling of the webservice computing system. Managing scaling of the webservice can then include proactively scaling hosting of at least one webservice in response to invocation history and/or usage of the webservice. Managing scaling can include allocating additional webservice instances of a particular webservice. Additional webservice instances can be allocated to handle more requests made to that webservice. Managing scaling can additionally include deallocating webservice instances as a form of scaling back. Webservice instances of a particular webservice can be deallocated when demand for a function call will be lower. Management can additionally include scaling according to temporal patterns, geographic demand patterns, usage patterns, and/or other suitable patterns. Different webservice will typically follow unique usage patterns. For example, a webservice for a ride sharing service may have a cyclical pattern following traffic patterns, and a webservice related to annual tax returns may have a yearly cyclical pattern. The method can preferably automatically scale the webservice resources to account for predicted demand. Historical trends of similar webservices may also be considered in assessing patterns of a webservice. Predictive modeling, machine learning, and artificial intelligence may be employed when managing the webservice cloud.

In one variation, managing scaling of webservices can account for combined webservice usage. Multiple webservices are preferably used in combination. Accordingly, many times the use of one webservice may often be accompanied by usage of one or more other webservices. In variation relating to external combined usage, an outside webservice will generally use multiple webservices of the FaaS platform as shown in FIG. 6. Furthermore, the method may include tracking the set of webservices used by a particular end client (e.g., an application, a service, script, etc.) and/or user account. For example, a weather-based web app may make use of a weather data webservice and a mapping webservice. As another example, a user account may have a set of webservices that are often used when interacting with the CLI of the FaaS platform. Combined usage of at least two webservices can be assessed or determined based on temporal proximity (e.g., probability of being used within short time intervals), usage patterns (e.g., do certain properties of usage of one webservice indicate different probabilities of use of another webservice), and/or other patterns of usage. For example, two webservices may be determined to have combined usage in association with a first account because of temporal proximity of invocation by that account—when the account uses one webservice it usually uses a second. In one variation, such combined usage analysis may be facilitated through machine learning across a number of contributing features.

In another variation, a webservice hosted in the FaaS platform may call one or more webservices as part of its execution logic as shown in FIG. 7. Analysis of a webservice may first identify the set of webservices used by the first webservice and then optionally determining the probability of usage of any one of the set of webservices. Such analysis may be recursive in that the use of one webservice may trigger the use of another webservice, which then uses yet another webservice and so on. Analysis of internal webservice usage may use semantic interpretation of the logic of a webservice and/or tracking usage of the webservice (similar to the external tracking of combined usage above).

Managing scaling of the webservice can then include architecting deployment of the first and second webservices based on the combined usage of the first webservice and at least a second webservice. This can be based on determined probability or assessed combined usage. Preferably, architecting deployment of webservices with combined usage will result in colocating webservice instances geographically (e.g., in the same data center), with respect to network topology (e.g., accessible over private network without use of public network), and/or with respect to computing device (e.g., webservices hosted on the same computing device for avoiding network usage). Accordingly, invocation of a first webservice may trigger the coordinated invocation of the second webservice The tracked usage may additionally be used in limiting usage and/or billing for usage of a webservice. Billing for a webservice will preferably include setting usage billing configuration in the webservice resource definition. A creator of a webservice can preferably customize various aspects of billing such as how usage is billed (e.g., by volume, per request, flat rate, etc.), the billing rates, billing tiers or plans, and/or other billing patterns. Accordingly, tracking invocation of a webservice will include tracking usage for individual accounts and generating a billing report according to usage of the individual accounts and the billing configuration. In this way billing could be automatically enabled and enforces, freeing the creator of the webservice from managing billing logistics. Furthermore, billing for the end user accounts can combine the billed usage for a set of webservices used by the account. In this way users could easily pay for different webservices without needing to manage multiple different accounts and payment plans.

As another variation, the method may enable a webservice provider to configure a function service for caching. A webservice that is substantially static could benefit from caching results. Accordingly, the method may include caching a response to a function call and returning the cached response to subsequent function calls corresponding to the function call. Corresponding function calls are preferably those made to the same webservice and with matching or equivalent input parameters. In one variation, caching may be an option enabled through the webservice configuration. A creator of the webservice may best understand if a webservice is suitable for webcaching and enable a caching option. Alternatively, automatic caching may be used by the FaaS platform. In automatic caching, the FaaS platform monitors usage of the webservice and determines if the webservice is classified as a cacheable. Alternatively, the method may include analyzing logic of the webservice to interpret the cacheability of results of a webservice. Furthermore, only results for particular function calls may be cached and used. The method could additionally enable other performance enhancements and optimizations.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
    creating a set of distinct webservices within a webservice hosting platform, the set of webservices created by a set of distinct accounts, and the creation of a webservice comprising:
        receiving a webservice resource definition,
        processing the webservice resource definition,
        analyzing the webservice resource definition and identifying a set of potentially used webservices used by the webservice and, for each potentially used webservice, determining a probability of usage, and
        instantiating a webservice of the webservice resource definition within the webservice hosting platform, which comprises architecting deployment of the webservice based on the determined probability of combined usage of at least two webservices in the set of used webservices: and
    invoking of a webservice instantiated in the webservice hosting platform for a client device, wherein responsive to an invocation is a process comprising:
        receiving a webservice function call request,
        executing the webservice function call request on a webservice instance, and
        responding to the webservice function call request with a result of the webservice.

2. The method of claim 1, wherein instantiating a webservice of the webservice resource definition within the webservice hosting platform comprises automatically providing a set of function call interfaces that comprise at least a command line interface and a library interface; and wherein the webservice function call request is received through at least one of the set of function call interfaces.

3. The method of claim 1, further comprising wherein instantiating a webservice of the webservice resource definition within the webservice hosting platform comprises automatically providing a set of function call interfaces that comprises at least a command line interface; and wherein the webservice function call request is received through at least one of the set of function call interfaces.

4. The method of claim 3, further comprising wherein instantiating a webservice of the webservice resource definition within the webservice hosting platform comprises automatically providing manual documentation through the command line interface to the set of webservices of the webservice hosting platform.

5. The method of claim 1, further comprising providing a query interface to the set of webservices, which comprises generating a set of Webserver query results in response to a webservice query.

6. The method of claim 1, further comprising providing a query interface to the set of webservices: wherein the webservice function call request is received in the form of a webservice query; and further comprising wherein executing the webservice function call request on a webservice instance comprises generating a set of Webserver query results in response to the webservice query, and automatically selecting one of the set of webservice query results as an invoked webservice, and executing the invoked webservice on the webservice instance.

7. The method of claim 6, wherein selecting one of the set of webservice query results selects the invoked webservice at least partially based on webservice popularity ranking.

8. The method of claim 1, further comprising tracking usage of the webservices.

9. The method of claim 8, further comprising proactively scaling webservice instances of at least one webservice in response to usage of the webservice.

10. The method of claim 8, further comprising architecting deployment of a set of webservices used in combination in response to tracked usage of the webservices.

11. The method of claim 8, wherein the webservice resource definition comprises usage billing configuration; wherein tracking usage of the webservice comprises tracking usage by a second account; and further comprising generating a billing report according to usage of the second account and the usage billing configuration.

12. The method of claim 1, further comprising analyzing combined usage of a first webservice and a second webservice; and architecting deployment of the first and second webservices based on the combined usage of the first webservice and the second webservice.

13. The method of claim 12, wherein combined usage is determined by temporal proximity of invocation by an account instance.

14. The method of claim 12, wherein combined usage is determined through detecting usage of at least a second webservice by a first webservice;
and wherein architecting deployment can comprise automatically instantiating an instance of the second webservice in coordination with instantiation of an instance of the first webservice.

15. The method of claim 14, wherein instantiating an instance of the second webservice in coordination with instantiation of an instance of the first webservice comprises colocating instances of the first and second webservice.

16. The method of claim 1, further comprising caching a response to a function call and returning the cached response to second corresponding function call.

17. The method of claim 1, further comprising providing a generic interface to a set of webservices; and when the webservice function call request is to the generic interface, dynamically selecting a selected webservice of a set of compatible webservices: and wherein executing the webservice function call request on a webservice instance comprises executing the selected webservice.

18. The method of claim 1, wherein the webservice resource definition includes a function definition and configuration definition.

19. The method of claim 18, wherein configuration definition can include namespace configuration, permissions, usage limits, and documentation.

20. A system for a function-as-a-service platform comprising:
a processor and memory configured with computer-readable instructions that when executed cause the system to:
for a set of webservices created by a set of distinct accounts of the platform, receive a webservice resource definition, process the webservice resource definition,
analyze the webservice resource definition and identify a set of potentially used webservices,
determine a probability of usage for each potentially used webservice,
and instantiate a webservice of the webservice resource definition within the function-as-a-service platform, which comprises architecting deployment of the webservice based on the determined probability of combined usage of at least two webservices in the set of used webservices;
receive a webservice function call request, execute the webservice function call request on a webservice instance, and respond to the webservice function call request with a result of the webservice;
and scale the set of webservices based in part on the probability of usage of webservices.

* * * * *